United States Patent [19]

Malion et al.

[11] 4,055,935

[45] Nov. 1, 1977

[54] CLUTCH BRAKE MECHANISM FOR LAWNMOWERS

[76] Inventors: William R. Malion, 7591 Pinehurst Road, Mentor on the Lake, Ohio 44060; John E. Watkins, 9674 Fairmont Road, Novelty, Ohio 44072

[21] Appl. No.: 655,866

[22] Filed: Feb. 6, 1976

Related U.S. Application Data

[63] Continuation of Ser. No. 459,540, April 10, 1974, abandoned.

[51] Int. Cl.² ............... A01D 75/18; A01D 69/10; H02G 11/00
[52] U.S. Cl. .................... 56/10.3; 56/11.3; 56/11.8; 188/77 W; 192/12 BA
[58] Field of Search ............... 56/11.8, 11.3, 10.3; 192/12 BA; 188/77 W, 17 D

[56] References Cited

U.S. PATENT DOCUMENTS

| | | | |
|---|---|---|---|
| 2,951,568 | 9/1960 | Hungerford, Jr. et al. | 192/12 BA |
| 2,985,992 | 5/1961 | Dowdle | 56/11.3 |
| 3,196,637 | 7/1965 | Orr | 56/10.3 X |
| 3,373,851 | 3/1968 | Baer | 192/12 BA |
| 3,378,123 | 4/1968 | Papa, Jr. | 192/12 BA X |
| 3,414,094 | 12/1968 | Hauser | 56/11.8 X |
| 3,425,526 | 2/1969 | Baer | 192/12 BA |
| 3,698,523 | 10/1972 | Bellinger | 192/12 BA |
| 3,837,450 | 9/1974 | Malion et al. | 192/12 BA |

Primary Examiner—Paul E. Shapiro
Attorney, Agent, or Firm—Watts, Hoffmann, Fisher & Heinke Co.

[57] ABSTRACT

A lawnmower has an improved clutch-brake mechanism interposed between the engine drive shaft and the rotating blade to stop the blade except when an operator tensions a control cable. The clutch-brake includes cylindrical input and output members selectively drivingly coupled by a clutch spring wound around both members. A control sleeve positioned around the clutch spring connects with the input end of the clutch spring. When the control sleeve is braked, the clutch spring releases its grip on the input member and the output is no longer driven. A coiled brake band extends around the control sleeve to selectively effect this braking action. An improved floating mount is provided for the brake band. An improved lost-motion connection is provided between the control sleeve and the output member to limit the twisting of the clutch spring. An optional slip clutch is provided for connecting the output member to the blade.

12 Claims, 8 Drawing Figures

CLUTCH BRAKE MECHANISM FOR LAWNMOWERS

This is a continuation of application Ser. No. 459,540 filed Apr. 10, 1974 now abandoned.

CROSS-REFERENCE RELATED TO APPLICATION

Application Ser. No. 304,046 filed Nov. 6, 1972, entitled CLUTCH BRAKE MECHANISM, here the "Clutch Brake Patent", the disclosure of which is incorporated by reference.

BACKGROUND OF THE INVENTION

1. Field of the Invention

The present invention relates generally to clutch-brake devices and more particularly to a lawnmower including a deadman-type clutch-brake for rapidly stopping the lawnmower blade when the operator releases a control handle.

2. Prior Art

Clutch brake mechanisms are known which are operable selectively to drivingly connect input and output elements for concurrent rotation or to brake the output. Most such known mechanisms are relatively complex assemblies which are expensive and which are not well adapted for use on lawnmowers and other relatively low-power implements due to their bulk and due to the amount of space they occupy.

There is an increasing need for a relatively simple clutch brake mechanism which can be installed as a safety device in the drive trains of lawnmowers to brake the lawnmower blade when the operator releases a control handle. Brake devices of this type are known in the art as "deadman brakes".

The referenced Clutch Brake Patent describes a relatively simple clutch-brake mechanism which is well adapted for use on lawnmowers. The present application addresses itself to several improvements which have been made in the device described in the earlier application.

SUMMARY OF THE INVENTION

The present invention overcomes a number of drawbacks in prior art clutch-brake devices and provides a novel and improved clutch-brake mechanism utilizing a coil spring to drivingly couple an input member and output member. A coiled braking member formed from spring steel operates on a sleeve which is positioned around and connected to the clutch coil spring to interrupt the driving connection provided by the clutch coil spring.

Clutch-brake mechanisms constructed in accordance with the present invention are typically characterized by four elements: (1) an input member; (2) an output member; (3) a spring connected to the output member for rotation therewith and extending around and in engagement with the input member to establish a driving connection between the input and output members; and (4) a braking structure including a sleeve positioned around and connected to the spring for rotation therewith and a restraining device selectively engageable with the sleeve to restrain the movement of the sleeve for interrupting the driving connection provided by the spring and braking the output member.

Preferably the input and output members have cylindrical portions of similar diameter positioned near each other and rotatable about a common axis concentric with the cylindrical portions. A coiled clutch spring extends around and firmly engages the cylindrical portions. The end region of the clutch spring which extends around the output member is connected to the output member. The other end region of the clutch spring wraps around the input member and connects with a sleeve positioned concentrically about the input member. By this arrangement, the interconnection between the output member and the spring and between the sleeve and the spring assure that the sleeve and the spring will rotate with the output member.

Braking of the output member is achieved by braking the rotation of the sleeve. The initial braking force serves to release the grip of the clutch spring coils about the input member thereby interrupting the driving connection provided by the clutch spring between the input and output members. As the rotation of the sleeve is braked to a halt, the output member, which is connected to sleeve by the clutch spring, is likewise braked.

In lawnmower applications, the braking system is normally engaged with the sleeve to provide a "deadman brake", and output rotation is permitted only when the braking system is deliberately released. A lost-motion connection is provided between the sleeve and the output member. This connection is arranged such that during the initial braking of the sleeve, the sleeve rotates a small amount relative to the output member to twist the clutch spring and release its grip about the input member. The lost-motion connection then takes effect to rigidly connect the sleeve and the output member to assure that further braking forces are not imposed on the clutch spring but are rather delivered directly from the sleeve to the output member. This arrangement assures that the clutch spring will not be subjected to force overloads and assures that the output is positively braked even in the event of clutch spring failure.

The improvements provided by the present invention relate to three aspects of the clutch-brake described in the "Clutch Brake Patent":

1. A somewhat simplified structure is provided for forming the lost-motion connection between the control sleeve and the output member;

2. A "floating mount" is provided to support and operate the brake band which brakes the control sleeve; and, 3. An alternate embodiment of the clutch-brake is provided which includes a slip clutch to eliminate sudden starting and stopping of the blade and the force overloads which may accompany these sudden starts and stops.

The improved lost-motion connection is much like one such connection described in the "Clutch Brake Patent". The described connection utilized two projections carried on the control sleeve which extended into two slots formed in the output member. The improved lost-motion connection reverses the slots and projections and provides two projections on the output member which extend into two slots or grooves in the control sleeve. The parts reversal provides a structure that is easier and less expensive to form.

The improved floating mount for the brake band minimizes drag of the brake band on the control sleeve, and substantially improves the operating life of the clutch-brake. The mount includes an elongated bracket which is slidably and pivotally mounted to extend past one side of the clutch-brake. The brake band is formed from spring steel and has a coiled central region that wraps around and normally frictionally engages the control sleeve. Opposite ends of the brake band extend tangentially of the coil and intersect at substantially right angles.

One of the brake band ends is secured rigidly to the elongated bracket by a threaded fastener. The threaded fastener is positioned along a line which is tangent to the brake band coil and which extends through the mounting bolt that supports the bracket. This positioning of the fastener is significant in that it assures that tension loads applied to the bracket by this end of the brake band will not torsionally load the bracket, and hence will not cause the bracket to pivot about its mounting bolt.

The other end of the brake band connects both to a flexible control cable and to a coiled tension spring. The tension spring connects with one end of the bracket and serves to tighten the grip of the brake band coils about the control sleeve. The control cable has a shield which connects to the opposite end of the elongated bracket and channels the flexible cable to a position where it can be engaged by an operator.

When the operator pulls on the cable, the biasing action of the tension spring is overcome and the brake band releases, permitting the lawnmower blade to rotate.

The movable mounting of the bracket, the location of the fastener which holds one end of the brake band, the right angle relationship of the brake band ends, and the common mounting of the tension spring and the control cable shield on the same bracket all contribute to minimize side-loads on the coils of the brake band, thereby eliminating drag on the control sleeve, and prolonging operating life of the clutch-brake.

The improved clutch-brake embodiment including a slip clutch has several advantages, particularly when applied to lawnmowers. To begin with, the slip clutch eliminates such problems as jerking of the lawnmower and engine stalling which can occur when the control cable is pulled rapidly to suddenly engage the stopped blade with the rotating drive shaft of the lawnmower engine. Secondly, the slip clutch permits a rotating blade to stop immediately when it strikes a rigid obstacle without transferring unduly high loads to the clutch components, or through the clutch components to the engine. In short, the advantages of this embodiment provide for smoother and safer operation.

As will be apparent from the foregoing summary, it is a general object to provide novel and improved clutch-brake mechanisms.

Another object is to provide a lawnmower including a novel and improved clutch-brake mechanism.

Other objects and a fuller understanding of the invention may be had by referring to the following description and claims taken in conjunction with the accompanying drawings.

DESCRIPTION OF THE PREFERRED EMBODIMENT

Figure 1:
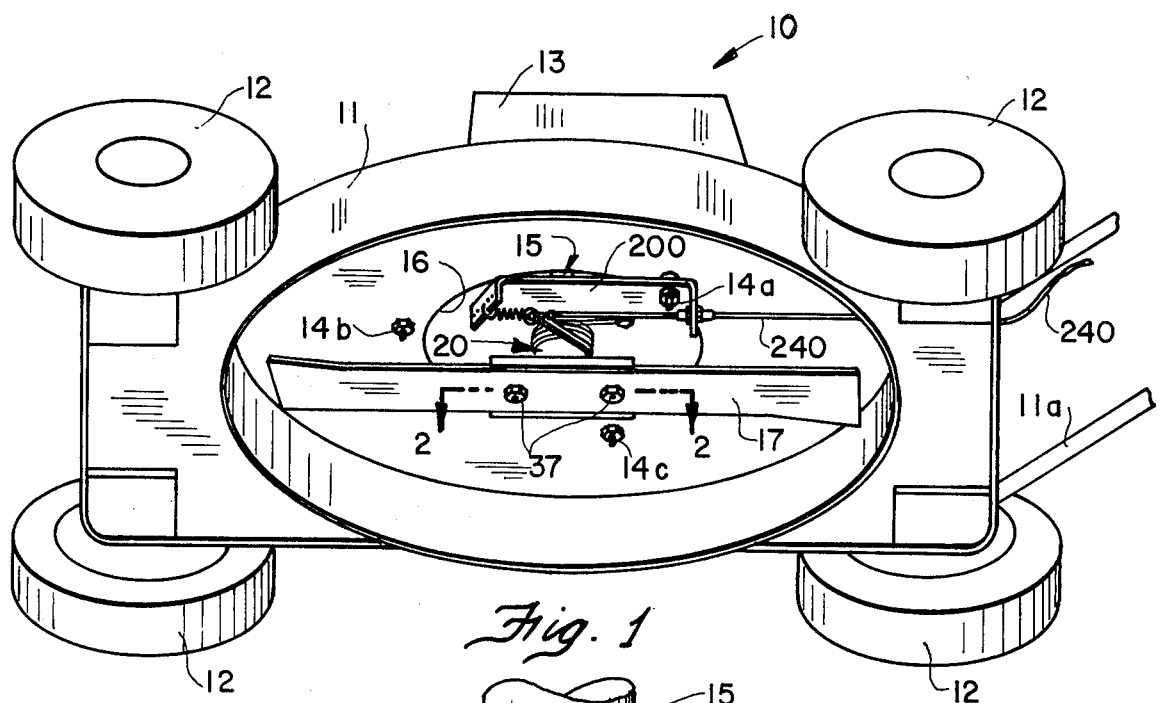
FIG. 1 is a perspective view of the underside of a rotary lawnmower including one embodiment of a clutch-brake mechanism constructed in accordance with the present invention.

Referring to FIG. 1, a rotary lawnmower is indicated generally by the numeral 10. The lawnmower 10 includes a housing 11 supported on wheels 12 for movement over a ground surface. A conventional handle structure 11a connects with the housing 11. An engine 13 is secured atop the housing 11. Three mounting bolts 14a, 14b, 14c secure the engine 13 to the housing 11. The engine 13 has a drive shaft 15 which depends centrally through an opening 16 formed in the housing 11. A clutch-brake 20 is carried on the drive shaft 15. A rotary blade 17 is carried by the clutch-brake 20.

The clutch-brake 20 is of the type described in the referenced "Clutch Brake Patent". While the structure and arrangement of the clutch-brake 20 will be described in detail, its elements can be summarized as including:

a. An input member 21 secured to the drive shaft 15 for rotation therewith;

b. An output member 22 secured to the blade 17 for rotation therewith;

c. A coiled clutch spring 23 wrapped around portions of the input and output members 21, 22 for selectively establising a driving connection therebetween;

d. A control sleeve 24 connected to the upper end of the clutch spring 23 for engaging and disengaging the driving connection between the input and output members 21, 22;

e. A brake band 25 wrapped around the sleeve 24 which, when released from the sleeve 24 will permit the blade 17 to rotate with the drive shaft 15; and when frictionally engaged with the sleeve 24 will brake the sleeve 24 to interrupt the driving connection between the input and output members 21, 22, causing the rotating blade 18 to stop; and, f. A floating mount for the ends of the brake band 25 including a bracket 200 movably carried on the engine mounting bolt 14a.

Figure 2:
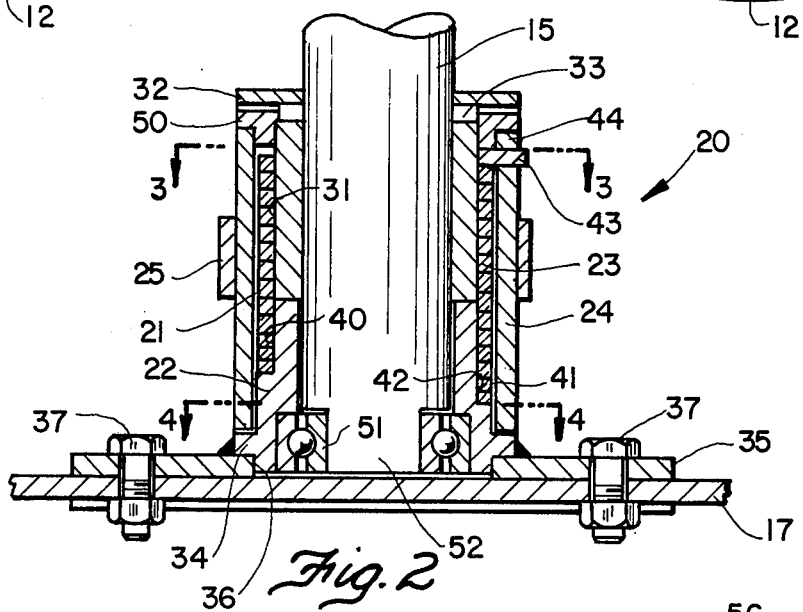
FIG. 2 is an enlarged cross-sectional view as seen from the plane indicated by the line 2—2 in FIG. 1.
Figure 3:
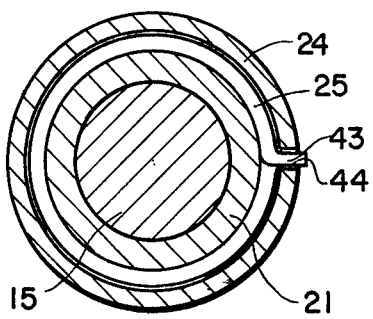
FIGS. 3 and 4 are cross-sectional views on the same scale as FIG. 2 as seen from planes indicated, respectively, by the lines 3—3 and 4—4 in FIG. 2.

Referring particularly to the clutch-brake embodiment 20 illustrated in FIG. 2, the input member 21 is a bushing which defines a cylindrical clutching surface 31. A radially extending flange is provided at the upper end of the input member 21. A roll pin 33 extends through aligned openings in the input member 21 and the drive shaft 15 to drivingly connect the input member and the drive shaft.

The output member 22 is an annular structure having a radially extending flange 34 formed near its lower end. A rectangular bracket 35 is welded to the flange 34 and has a centrally located aperture 36 which receives the lower end of the output member 22. Threaded fasteners 37 extend through aligned apertures in the bracket 35 and the blade 17 to secure the blade 17 to the bracket 35.

Figure 4:
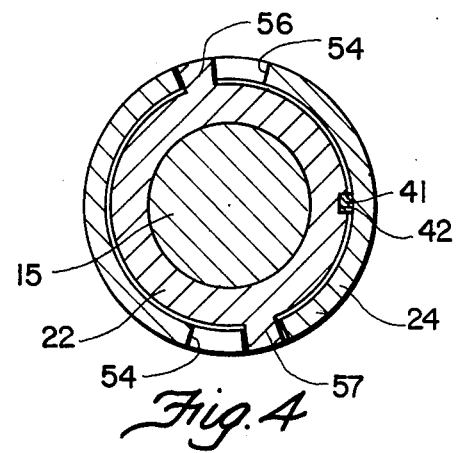

A cylindrical clutching surface 40 is defined on the upper end region of the output member 22. The lower portion of the clutch spring 23 is wound around and grips the clutching surface 40. The lower end 41 of the clutch spring 23 is received in a notch 42 formed in one side of the output member 22, as best seen in FIG. 4. The upper portion of the clutch spring 23 is wound around and grips the clutch surface 31. The upper end 43 of the clutch spring 23 is received in a notch 44 formed in the control sleeve 24.

A bronze bearing 50 is interposed between the upper end region of the control sleeve 24 and the input member 21. A ball bearing 51 is interposed between a reduced diameter lower end region 52 of the shaft 15 and the lower end of the output member 22. The bearings 50, 51 permit the sleeve 24 and the output member 22 to rotate relative to the drive shaft 15.

Referring to FIG. 4, a lost-motion connection is provided between the control sleeve 24 and the output member 22. Two slots or notches 54, 55 are formed in the control sleeve 24. A pair of radially extending projections 56, 57 formed integrally with the output member 22 extend into the slots 54, 55. The projections 56, 57 are located such that when the control sleeve 24 is not being braked by the band 25, the projections are normally in engagement with one end of the slots 54, 55. When the band 25 is tightened into engagement with the outer surface of the control sleeve 24, the projections 56, 57 rotate into engagement with opposite ends of the slots 54, 55 thereby limiting the relative rotation which can occur between the output member 22 and the control sleeve 24. This lost-motion connection limits the twisting deflection of the clutch spring 23 during braking and also provides for positive braking of the output member 22, even if the clutch spring 23 should fail.

Figure 5:
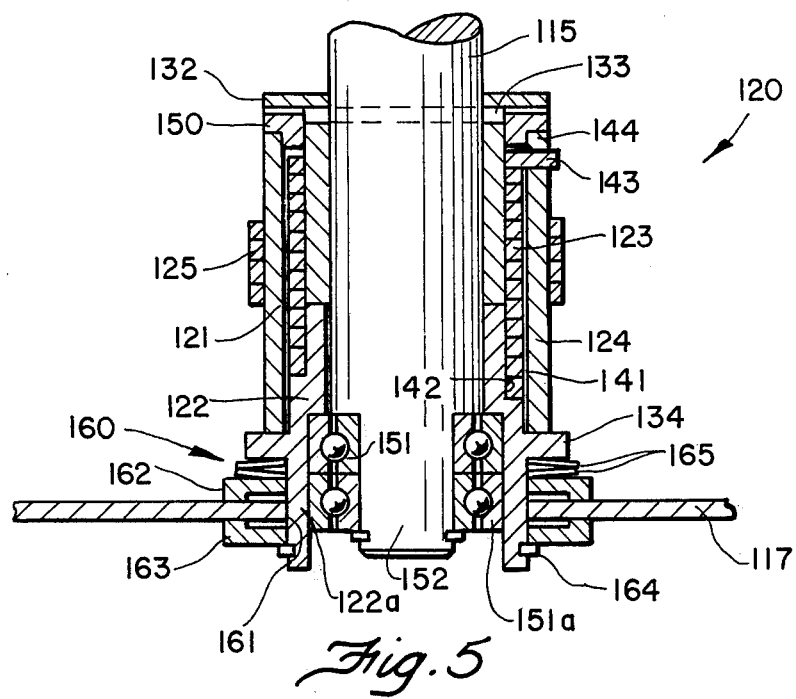
FIG. 5 is a cross-sectional view similar to FIG. 2 of an alternate clutch-brake embodiment including a slip clutch.

Referring now to FIG. 5, an alternate embodiment of the clutch brake including a slip clutch is shown generally by the reference numeral 120. Most of the components of the clutch brake 120 correspond in all respects to those described in conjunction with the clutch brake 20. The corresponding elements in the clutch brakes 120, 20 are designated by numerals which differ one from the other by a factor of 100. For example, the input and output members of the clutch brake 120 which correspond to the input and output members 21, 22 of the clutch brake 20, are designated by the numerals 121, 122.

The principal difference between the clutch brakes 20, 120 is that the clutch brake 120 includes a slip clutch designated generally by the numeral 160. In forming the slip clutch 160, the output member 122 and the drive shaft 115 are extended downwardly and an additional ball bearing 151a is provided beneath the ball bearing 151. The blade 117 is provided with a central aperture 161 which is journaled about the extended portion 122a of the output member 122.

A pair of annular frictional discs 162, 163 are journaled about the extended portion 122a of the output member 122. The discs 162, 163 are formed from conventional friction materials such as powdered iron including a small percentage of powdered copper. A locking ring 164 is carried in a groove in the output member beneath the lower disc 163. A pair of conventional spring washers 165 known in the art as "Belville washers" are mounted in opposed relationship and are interposed between the flange 134 and the upper disc 162. The washers 165 exert a biasing action which biases the upper disc 162 into firm frictional engagement with the blade 117.

Figure 6:
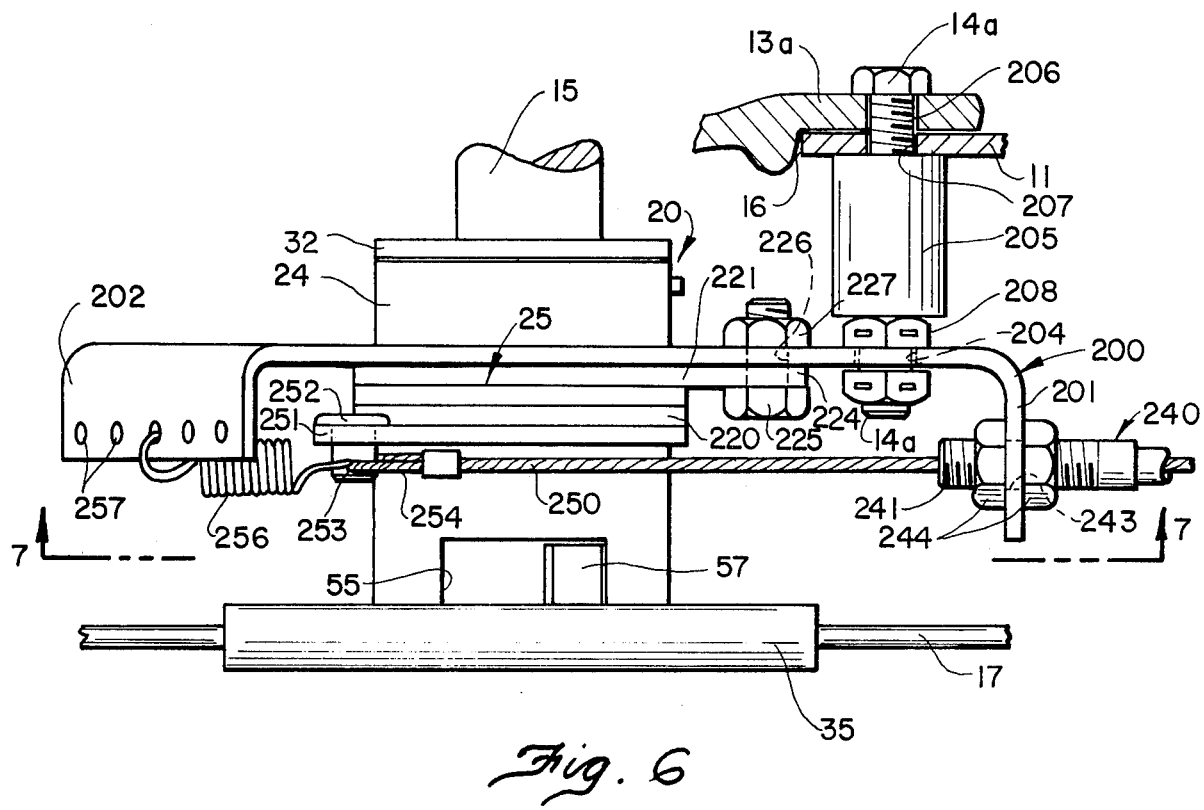
FIG. 6 is an enlarged elevational view of a portion of the lawnmower of FIG. 1 with portions of the lawnmower housing and engine broken away.
Figure 7:
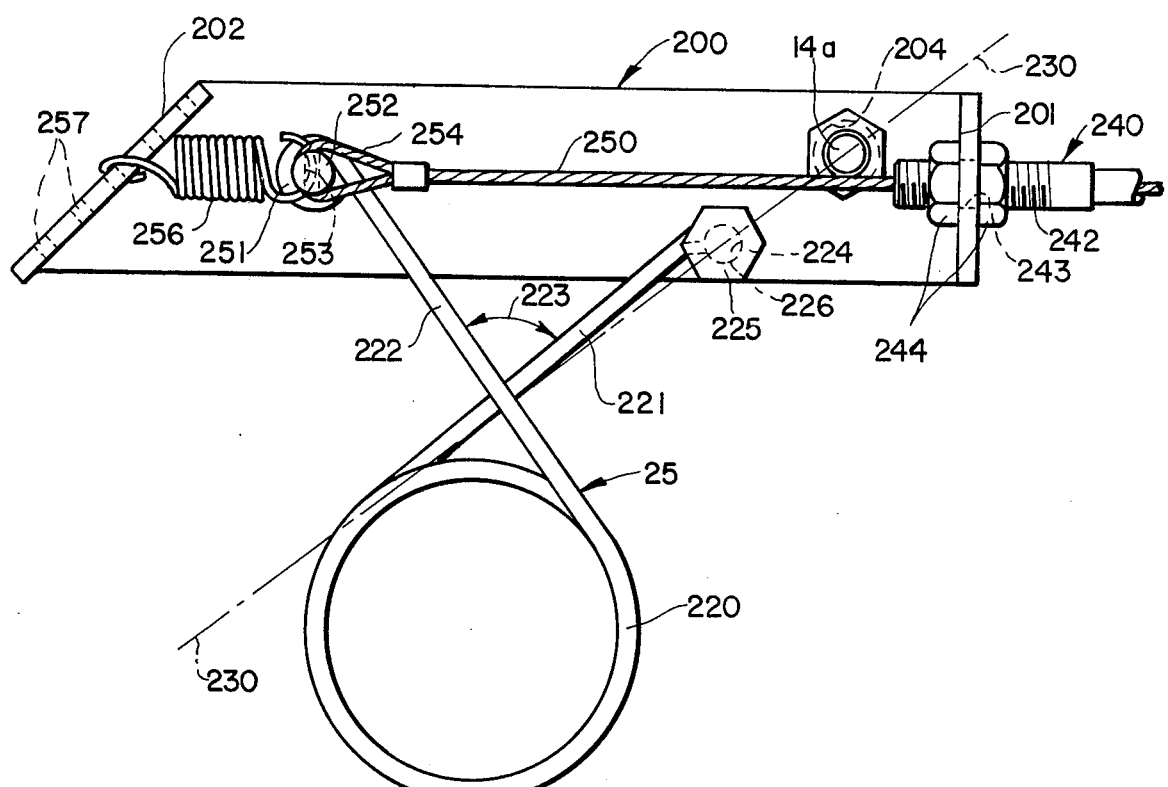
FIG. 7 is a bottom view on the same scale as FIG. 6 of portions of the mechanism shown in FIG. 6, the view being taken substantially from the plane indicated by the line 7—7 in FIG. 6; and, FIG. 8 is an elevational view of still another clutch-brake embodiment with portions broken away and shown in cross-section in the manner of FIGS. 2 and 5.

Referring to FIGS. 6 and 7, a floating mount is shown which can be used with either of the clutch brake embodiments 20, 120 to support the brake bands 25, 125. The floating mount includes a bracket 200 which is movably carried on the engine mounting bolt 14a. Opposite end regions of the bracket 200 are bent downwardly to define flanges 201, 202.

As is best seen in FIG. 6, the engine mounting bolt 14a extends through aligned apertures 206, 207 in an engine mounting flange 13a and the housing 11, and through a tubular spacer 207. A lock nut 208 is threaded onto the bolt 14a and is tightened in place against the spacer 205. A hole 204 is formed through the bracket 200. The hole 204 has a diameter which loosely receives the mounting bolt 14a. A second locking nut 209 is threaded onto the bolt 14a and is tightened to a position which will limit the movement of the bracket 200 to motion in a horizontal plane, i.e. perpendicular to the axis of the bolt 14a. The play between the hole 204 and the bolt 14a limits movement of the bracket 200 in horizontal directions.

The brake band 25 has a coiled central region 220 and opposite end regions 221, 222 which extend tangentially to the coil 220. The angle of intersection between the end regions 221, 222, as designated by the numeral 223 in FIG. 7, is preferably about 90°. The 90° relationship has been found to be advantageous in eliminating lateral force loadings on the coiled portion 220 of the brake band.

The end region 221 terminates in a coiled portion 224. A cap screw 225 extends through the coiled end portion 224 and through a hole 226 in the bracket 200, and is secured by a locking nut 227. The hole 226 is preferably located along a line indicated in FIG. 7 by the numeral 230. The line 230 is defined as being tangent to the coil 220 and as extending through the center of the mounting hole 204. By this arrangement, torque loads which are exerted on the spring coil 220 and transferred as tension loads along the end region 221 to the cap screw 225 will not cause the bracket 200 to pivot about the mounting bolt 14a.

The end region 222 terminates in a coiled portion 251. A headed pin 252 extends through the coiled end portion 251. A hole 253 is formed through the pin 252. A tension coil spring 256 has one end which extends through the hole 253. The other end of the spring 256 extends toward the flange 202 and is received in one of a plurality of spaced holes 257 formed in the flange 202. As is best seen in FIG. 7 the flange 202 is inclined relative to the longitudinal axis of the bracket 200 to position the holes 257 at different distances from the pin 252. The tension force which the spring 256 exerts on the brake band end 222 is controlled by selecting which of the holes 257 the spring 256 connects with.

A shielded control cable assembly 240 is provided for releasing the grip of the coiled brake band 25 about the control sleeve 24. The control cable assembly 240 includes a shield 241 having a threaded end region 242. An aperture 243 is formed in the bracket flange 201 to receive the threaded end 242. A pair of locking nuts 244 are threaded onto the end region 242 on opposite sides of the bracket end 201 and secure the shield 241 to the bracket.

A flexible wire cable 250 extends through the shield 241. A loop 254 is formed on one end of the flexible cable 250. The loop 254 extends through the hole 253 in the pin 252. The other end of the flexible cable 250 (not shown in the drawings) extends up the handle structure 11a to a position where it is readily accessible to an operator. When the operator tensions the cable 250, the biasing action of the spring 256 is overcome and the grip of the brake band coils 220 on the control sleeve 24 is released.

Figure 8:
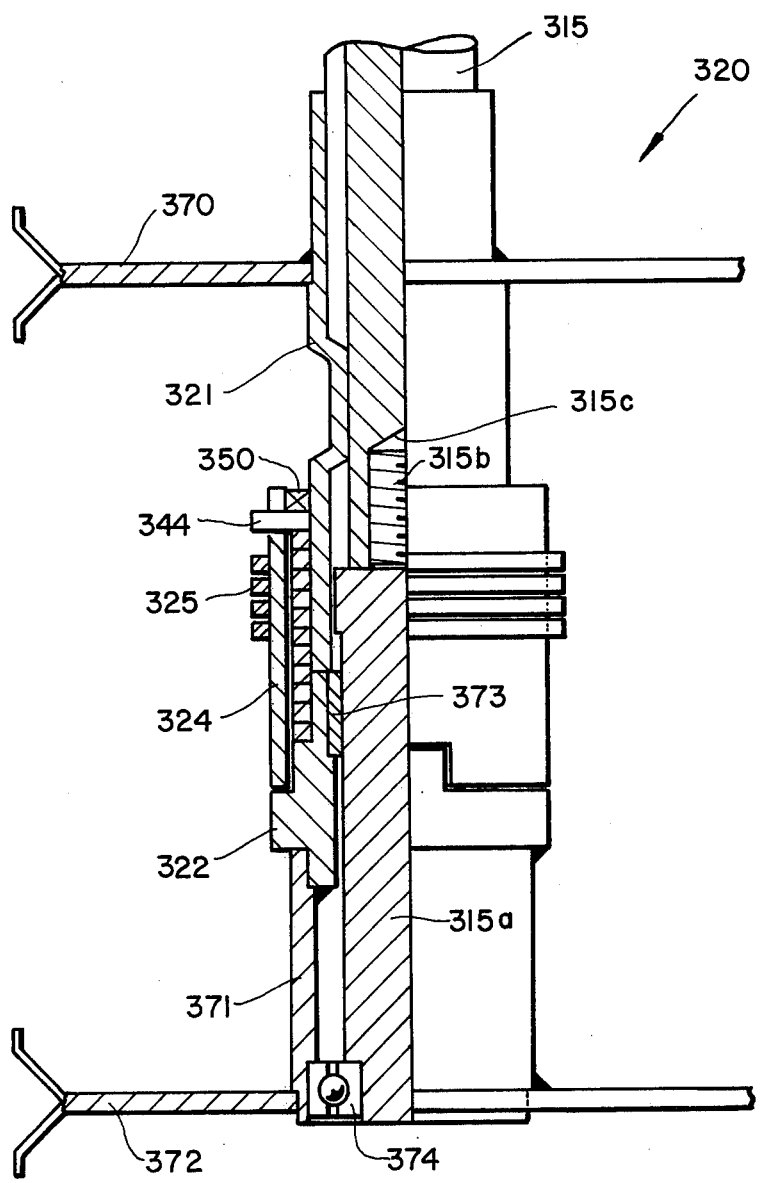

Referring to FIG. 8, still another clutch brake embodiment is shown generally at 320. In the FIG. 8 embodiment, a motor drive shaft 315 is provided with an extension 315a. The extension shaft 315a has a threaded upper end region 315b which is received in a threaded aperture 315c formed in the lower end of the drive shaft 315. The input member 321 is an elongated sleeve which carries a continuously running pulley 370. The output member 322 is provided with an extension sleeve 371 which carries an output pulley 372. A bronze bearing 373 is interposed between the output member 322 and the shaft extension 315a. A ball bearing 374 is interposed between the output extension sleeve 371 and the shaft extension 315a. The other components of the clutch-brake embodiment 320 correspond with the components in the embodiments 20, 120 and are accordingly designated by reference numerals of the 300 series which correspond with those used in FIGS. 2 and 5.

The embodiment of FIG. 8 is used on large rotary mowers where belts reeved around the pulleys 370, 372 are used, respectively, to power a propulsion system and the lawnmower blade. The floating mount shown in FIGS. 6 and 7 is used to support the brake band 325.

Although the invention has been described in its preferred form with a certain degree of particularity, it is understood that the present disclosure of the preferred form has been made only by way of example and numerous changes in the details of construction and the combination and arrangement of parts may be resorted to without departing from the spirit and the scope of the invention as hereinafter claimed.

We claim:

1. In a lawnmower of the type including a drive shaft adapted for connection to a source of rotary motion, a rotatably mounted blade, and drive system for selectively drivingly connecting the drive shaft and the blade, the improvement wherein the drive system includes a combination clutch-brake device, comprising:
   a. an input member coupled to the drive shaft and having a drive portion formed thereon including peripheral wall portions concentric about an axis;
   b. an output member coupled to the blade and positioned near said input member;
   c. said members being relatively rotatable about said axis;
   d. spring means connected to said output member for rotation therewith and extending around and in engagement with said input member to establish a driving connection therebetween which is normally operable, when said input member is rotated in a selected direction, to drive said output member;
   e. braking means for interrupting said driving connection and for braking the rotation of said output member, including:
      i. sleeve means positioned around portions of said spring means and connected to said spring means for rotation therewith;
      ii. restraining means including a spring steel multiple wrap brake band having a coiled central region extending around said sleeve means to restrain the movement thereof to release the grip of said spring means on said input member thereby interrupting said driving connection, and to restrain the rotation of said output member, said multiple wrap brake band also having opposite end regions extending away from said coil and intersecting at substantially right angles;
      iii. bracket means, including a bracket movably carried near one side of said sleeve means, connecting with one of said end regions for restraining the brake band against rotation with said sleeve means, said end regions extending to positions overlying said bracket;
      iv. a control cable connected to the other of said end regions for moving said other end region to selectively release and establish braking engagement with said coiled central region and said sleeve means; and
      v. biasing means connecting with said other end region and with said bracket to bias said other end in a direction which will tighten the grip of said coiled central region around said sleeve means.

2. The device of claim 1 wherein:
   a. said bracket is formed from a strip of metal with opposite end portions bent away from the plane of the strip to define first and second end flanges;
   b. said control cable is provided with a shield secured to said first end flange; and
   c. said biasing means includes a tension coil spring connected at one end to said other end region and at the other end to said second end flange.

3. In a lawnmower of the type including a drive shaft adapted for connection to a source of rotary motion, a rotatably mounted blade, and drive system for selectively drivingly connecting the drive shaft and the blade, the improvement wherein the drive system includes a combination clutch-brake device, comprising:
   a. an input member coupled to the drive shaft and having a drive portion formed thereon including peripheral wall portions concentric about an axis;
   b. an output member coupled to the blade and positioned near said input member;
   c. said members being relatively rotatable about said axis;
   d. spring means supported on said output member for rotation therewith and extending around and in engagement with said input member to normally establish a driving connection therebetween which is operable, when said input member is rotated in a selected direction, to drive said output member;
   e. braking means for interrupting said driving connection and for braking the rotation of said output member, including:
      i. sleeve means positioned around portions of said spring means and connected to said spring means for rotation therewith;
      ii. restraining means including a spring steel brake band having a coiled central region extending around said sleeve means and also having opposite end regions extending away from said coil and intersecting substantially at right angles;
      iii. biasing means normally biasing said central region into braking engagement with said sleeve means to restrain the movement thereof to release the grip of said spring means on said input member thereby interrupting said driving connection, and to restrain the rotation of said output member;

iv. operating means connected to said restraining means and for selectively releasing the braking engagement between said central region and said sleeve means to permit rotation of said output member;

v. bracket means, including a bracket movably carried near one side of said sleeve means, connecting with one of said end regions for restraining the brake band against rotation with said sleeve means, said end regions extending to positions overlying said bracket, said bracket being formed from a strip of metal with opposite end portions bent away from the plane of the strip to define first and second end flanges, said bracket including a mounting hole formed therethrough near said first end flange, the connection between said one end and said mounting bracket being located along a line which is tangent to said central coiled region and extending through said mounting hole;

vi. said operating means including a control cable connected to the other of said end regions for moving said other end region to selectively release and establish braking engagement between said coiled central region and said sleeve means, said control cable being provided with a shield secured to said first end flange; and vii. said biasing means connecting with said other end region and with said bracket to bias said other end region in a direction which will tighten the grip of said coiled central region around said sleeve means, said biasing means including a tension coil spring connected at one end to said other end region and at the other end to said second end flange.

4. The device of claim 3 additionally including a slip clutch interposed between said output member and said blade.

5. The device of claim 4 wherein:
a. said output member defines a cylindrical mounting surface;
b. said blade has a centrally located hole which receives said cylindrical mounting surface; and,
c. said slip clutch includes:
   i. annular friction disc means carried on said cylindrical mounting surface on opposite sides of said blade; and,
   ii. biasing means biasing said friction disc means into engagement with said blade.

6. In a lawnmower of the type including a drive shaft adapted for connection to a source of rotary motion, a rotatably mounted blade and a drive system for selectively drivingly connecting the drive shaft and the blade, the improvement wherein the drive system includes a combination clutch-brake comprising:
a. an input member defining a cylindrical input surface coaxially coupled to the drive shaft;
b. an output member defining cylindrical output surface coupled to the blade, said output surface having a diameter substantially the same as said input surface and being coaxially carried adjacent said input surface;
c. a clutch spring wrapped around said surfaces for selectively establishing a driving connection between said surfaces;
d. a sleeve carried coaxially about a portion of said clutch spring and coupled to one end region thereof for rotation therewith, said sleeve being operable, when braked and when released to establish and release said driving connection;
e. a brake band having a coiled central region extending around said sleeve and having opposite end regions extending away from said coiled region;
f. support means connected to one of said end regions for restraining the said brake band against rotation while permitting limited movement of said one end region so said coiled region can self-center about said sleeve;
g. biasing means interposed between the other of said end regions and said support means for tightening the coiled region of said band around said sleeve; and,
h. control means connected to said other end region for moving said other end region in opposition to the action of said biasing means to release said coiled region from said sleeve whereupon said clutch spring establishes a driving connection from said drive shaft to said blade.

7. The lawnmower of claim 6 wherein:
a. said support means includes a bracket and fastening means mounting said bracket for movement in a plane perpendicular to the axis of said sleeve;
b. said one end region of said band is secured to said bracket; and,
c. said biasing means is secured to said bracket.

8. The lawnmower of claim 6 additionally including a slip clutch drivingly connecting said output surface and the blade for interrupting the driving connection therebetween when the driving torque applied to the blade exceeds a predetermined level.

9. A combination clutch-brake device comprising:
a. an input member having a drive portion formed therein including a cylindrical input surface concentric about an axis;
b. an output member positioned near said input member;
c. said members being relatively rotatable about said axis;
d. spring means supported on said output member for rotation therewith and extending around and in engagement with said input surface to normally establish a driving connection between said members which is operable, when said input member is rotated in a selected drive direction, to drive said output member;
e. braking means for interrupting said driving connection and for braking the rotation of said output member, including:
   i. sleeve means positioned around portions of said spring means and connected to said spring means for rotation therewith;
   ii. restraining means including a brake bank having a coiled central region extending around said sleeve means and opposite end regions extending away from said coiled region;
   iii. bracket means, including a bracket movably carried near one side of said sleeve means, connected to one of said end regions for restraining said band against rotation with said sleeve means, said end regions extending to positions overlying said bracket;
   iv. biasing means connected to the other of said end regions and to said bracket means to bias said other end in a direction which will tighten the grip of said coiled region around said sleeve means to restrain the movement thereof to release the grip of said spring means on said input member thereby interrupting said driving connection, and to restrain the rotation of said output member; and, v. operating means connected to said other end region for moving said other end region to selectively release and engage said coiled region with said sleeve means.

10. The device of claim 9 wherein:

a. said bracket is formed from a strip of metal with opposite end portions bent away from the plane of the strip to define first and second end flanges;

b. said operating means includes a shielded control cable, the shield of which is secured to said first end flange;

c. said biasing means includes a tension coil spring connected at one end to said other end region and at the other end to said second end flange.

11. The device of claim 10 wherein:

a. said bracket has a mounting hole formed therethrough near said first end flange; and, b. the connection between said one end and said mounting bracket is located along a line which is tangent to said central coiled region and which extends through said mounting hole.

12. The device of claim 9 wherein:

a. said output member defines a cylindrical mounting surface;

b. a driven member has a centrally located hole which receives said cylindrical mounting surface; and, c. a slip clutch is interposed between said output member and said driven member including:

i. annular friction disc means carried on said cylindrical mounting surface on opposite sides of said drive member; and, ii. biasing means biasing said friction disc means into engagement with said drive member.

* * * * *